United States Patent

[11] 3,581,827

[72] Inventor Michael D. Ratcliff
  Burlington, Iowa
[21] Appl. No. 764,852
[22] Filed Oct. 3, 1968
[45] Patented June 1, 1971
[73] Assignee J. I. Case Company
  Racine, Wis.

[54] CONTROL DEVICE FOR EARTH WORKING TOOL
  1 Claim, 2 Drawing Figs.
[52] U.S. Cl. ................................................ 172/307,
  37/193, 172/413, 172/464
[51] Int. Cl. .................................................. B66f 11/02
[50] Field of Search ...................................... 172/307,
  413, 417, 464, 484, 491, 444, 449; 37/193

[56] References Cited
UNITED STATES PATENTS
2,346,757 4/1944 Horner ........................ 172/449X
2,819,665 1/1958 Skeem ........................... 172/444
3,032,903 5/1962 Ede ............................... 37/193
3,347,564 10/1967 Snoozy ......................... 172/484X FOREIGN PATENTS
1,308,449 9/1962 France ......................... 172/741
234,013 6/1961 Australia ...................... 172/484
609,554 11/1960 Canada ........................ 172/464
1,202,655 1/1960 France ......................... 172/464

Primary Examiner—Robert E. Pulfrey
Assistant Examiner—C. Coughenour
Attorney—Settle, Batchelder & Oltman ABSTRACT: A tractor having an earth working tool, such as a ripper, attached to the rear end thereof by linkage means and raised and lowered with respect to the tractor by power means. The power means include fluid rams disposed in vertical alignment with upper and lower links so that the links at all times protect the ram from destructive forces. The upper link is longer than the lower link so that the shank of the ripper is disposed substantially perpendicular to the transverse axis of the vehicle in its ground working position but is angularly disposed thereto in its transport position.

INVENTOR.
MICHAEL D. RATCLIFF.
BY
SETTLE, BATCHELDER & OLTMAN.
ATT'YS.

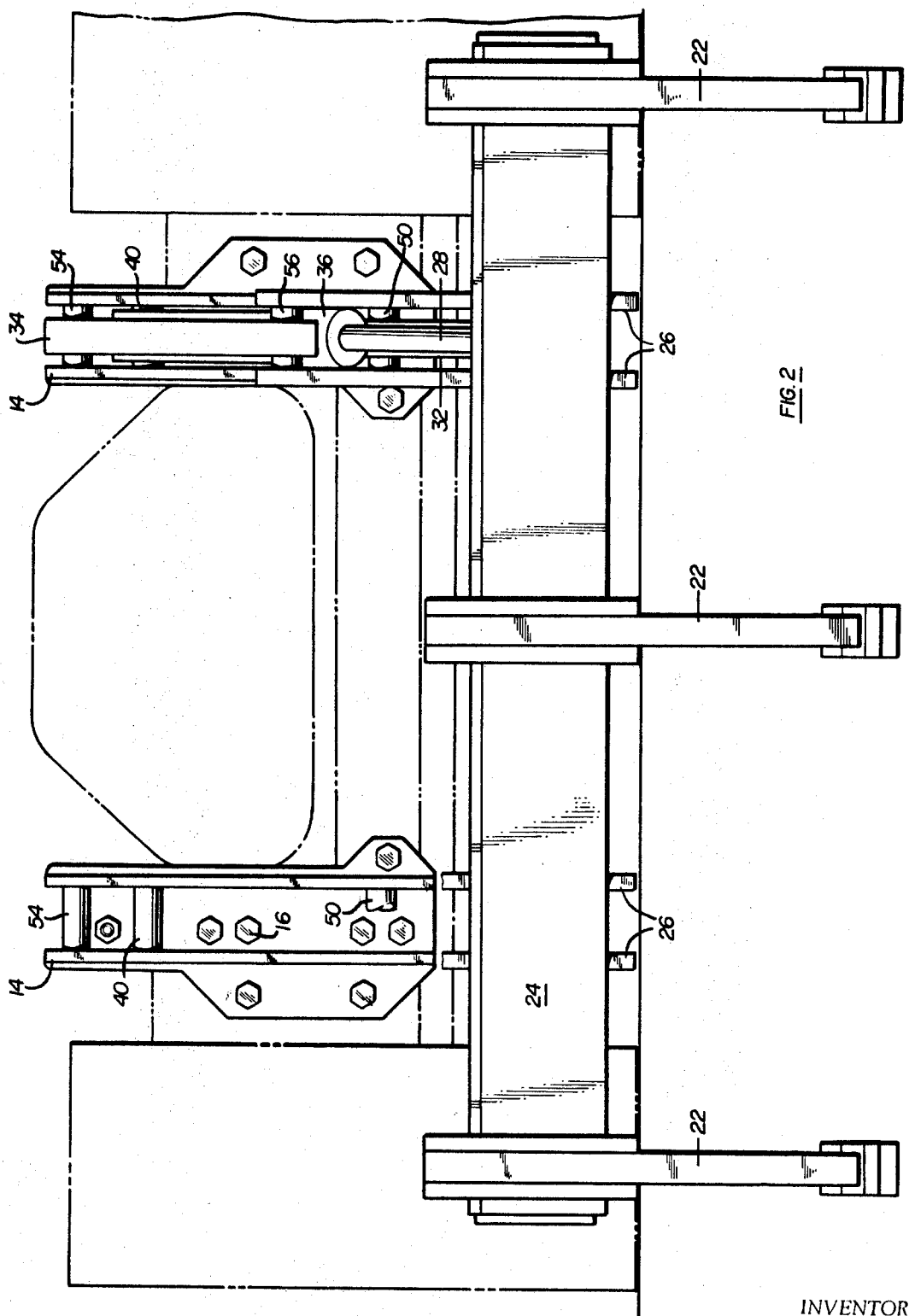

CONTROL DEVICE FOR EARTH WORKING TOOL

BACKGROUND OF THE INVENTION

The present invention relates generally to implements supported on a tractor and more particularly to an improved linkage and control system for connecting an implement to a tractor.

In earth working implements, such as "rippers," it is common practice to fixedly secure ripper shanks having ripper teeth on the free ends thereof to a substantially transversely extending frame pivotally supported adjacent the rear end of a vehicle, such as a tractor. This type of implement is normally used to penetrate and upset or break through the formation of the earth. Thus, the ripper or earth working tool rips obstacles and various other large pieces of debris from the ground which, in many instances, are forced against the power means normally associated with such an implement. Conventionally, the power means includes fluid rams having piston rods slidable in cylinders and interposed between the frame and the tractor. Of course, even a small nicking of the piston rod surface will cause leakage between the cylinder and piston rod which requires replacement and complete reworking of the fluid ram. Of course, such constant replacement and reworking is not only time consuming but is also costly.

Also, in order to gain optimum working conditions for the ripper, it is desirable that the shank of the ripper be at all times substantially perpendicular to the ground while it is in its earth working condition. This is normally accomplished by a linkage interconnection between the frame supporting the ripper shank and the tractor frame. However, heretofore such a linkage has resulted in having the shank axis tilted rearwardly with respect to the vertical axis of the vehicle when the device is in the transport position thus disposing the lower end of the shank and the tooth connected thereto at a considerable distance rearwardly of the tractor and the transversely extending frame.

SUMMARY OF THE INVENTION

The present invention overcomes the above-mentioned difficulties by providing a draft and linkage control system for a tractor drawn ripper or implement which is capable of maintaining the ripper elements substantially vertical while its in the earth working position and tucking the tooth shank under the frame and the supporting linkage while the ripper is in its elevated or transport position. During the entire extent of movement, the power means for raising and lowering the ripper with respect to the tractor is at all times protected from rocks, debris, and other destructive forces.

The above is accomplished by having the power means such as fluid rams, disposed in vertical alignment and between upper and lower interconnecting links forming part of the linkage means. The lower link is slightly shorter in length than the upper link so that in the normal ground working position, with the links being parallel, the shank of the tool is substantially perpendicular to the ground while in its transport position, the shank is inclined forwardly and downwardly to dispose the ground working end thereof forwardly of the transverse axis of the frame and below the linkage connecting the frame to the tractor.

Thus, the primary object of the present invention is to provide a draft and linkage control system for a tractor supported implement in which the control is at all times protected from rocks and debris which may be encountered during normal operation of the implement.

Another object is to provide the linkage and control system between the frame of an implement and a tractor which will maintain a substantially constant implement angle when the frame is in the ground working position and which operates to tilt the axis of the ground working implement downwardly and forwardly to dispose the elements below the linkage system while its in transport position.

BRIEF DESCRIPTION OF THE DRAWINGS

FIG. 2 is a plan view of the implement and tractor shown in FIG. 1.

DETAILED DESCRIPTION

Figure 1:
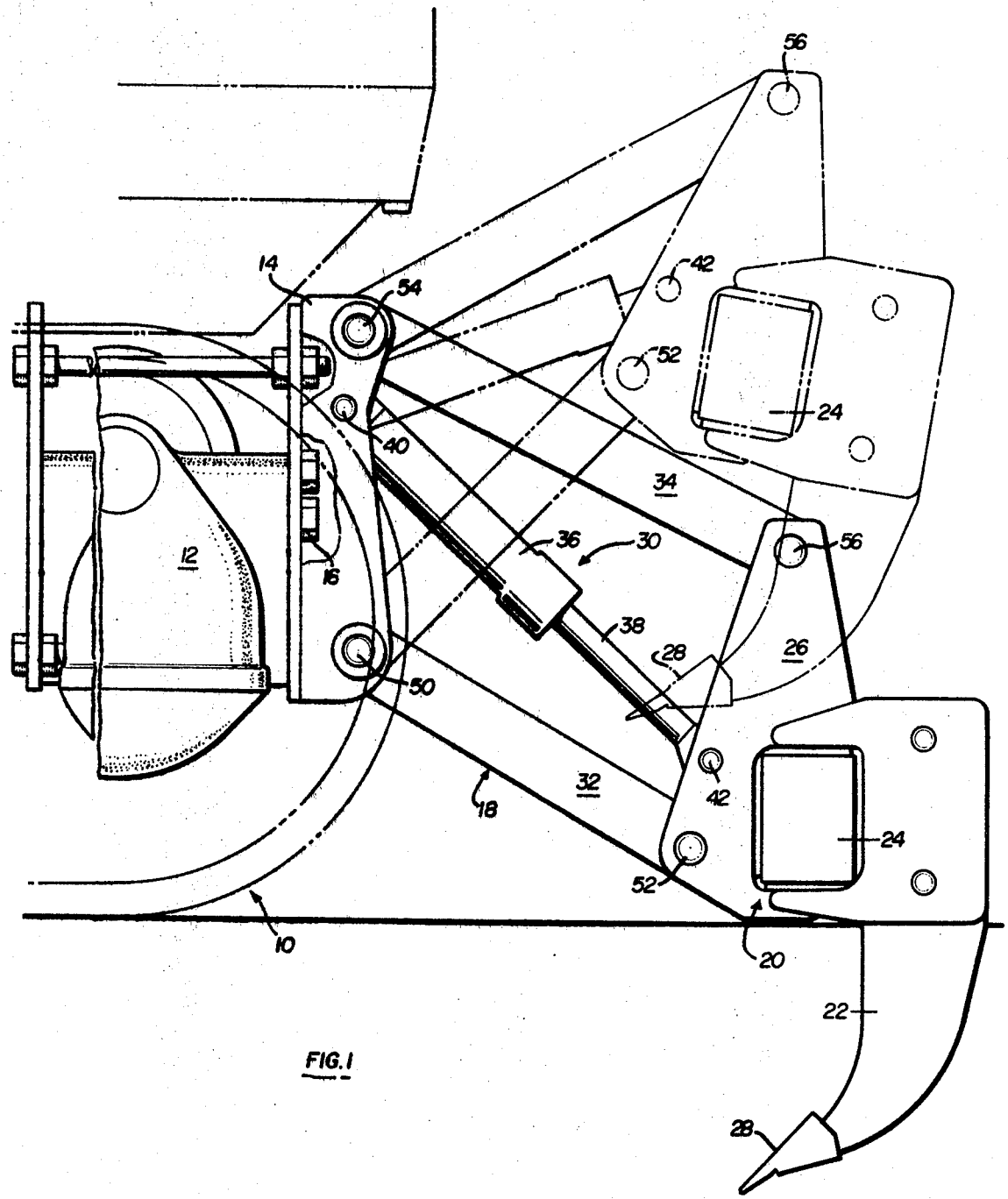
FIG. 1 is a side elevational view of the tractor supported implement having the present invention incorporated therein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 of the drawings, a vehicle or tractor is generally designated at 10 and is illustratively shown as a continuous tread-type vehicle having a chassis or frame generally designated at 12. The chassis or frame has a pair of transversely spaced vertically extending columns or supporting elements 14 fixedly secured thereto by bolts 16.

Linkage means 18 form a connection between the tractor and more specifically the vertical extending columns 14 and a frame 20 having ripper element shanks 22 fixedly secured thereto. The frame 20 includes an elongated transversely extending beam 24 with spaced brackets 26 fixedly secured adjacent opposite ends thereof and one or more shanks 22 secured at transversely spaced points to the beam 24. Of course, the lower ends of each shank 22 each have a tooth 28 fixedly secured thereto for engagement with the ground. Power means 30 are interposed between the tractor and the frame.

According to the primary aspect of the present invention, the power means 30 are disposed between vertically spaced links 32 and 34 defining the linkage means 18 interconnecting the frame 20 with the tractor 10. An inspection of FIG. 2 shows that the respective links 32 and 34 lie in a common vertical plane with the longitudinal axis of the fluid ram or power means 30. This particular feature is of extreme importance in providing a suitable maintenance free implement. The specific location of the power means provides a protected area directly below and directly above the power means or fluid ram to prevent rocks or other debris from striking the fluid ram and causing damage or injury to the parts thereof.

Referring again to FIG. 1, it will be noted that the fluid ram includes a cylinder 36 and a piston rod 38 slidable within the cylinder 36. The head or free end of the cylinder 36 is pivotally connected by a pin 40 to the column 14 while the free end of the piston rod 38 is connected by a pin 42 to the bracket 26 forming part of the frame 20.

It should be noted that the largest volume end of the fluid cylinder 36 is disposed adjacent the tractor so that the greatest amount of force is available for forcing the teeth 28 into the ground during movement of the ripper frame to the ground engaging position. It should also be noted at this point that the pivot pin 40 is disposed closely adjacent the upper end of the column 14 while the pivot pin 42 is disposed adjacent the lower end of the fixed bracket 26 forming part of the frame 20. This of course considerably increases the leverage available for forcing the ground engaging tool 28 into the soil.

According to a further aspect of the present invention, the opposite ends of the respective links 32 and 34 are respectively connected at vertically spaced points in a common plane with the pivot pins 40, 42 with the pivotal connection of the respective ends of the links spaced above and below the respective pivot pins for the fluid ram. Thus, one end of lower or first link 32 is pivoted at 50 on the vertically extending column 14 at a point below and in vertical alignment with the cylinder pivot pin 40 and the opposite end thereof is pivoted by pin 52 at a point spaced below the pivot pin 42. Likewise, link 34 has one end pivoted at 54 at a point spaced above the pivot pin 40 on column 14 while the opposite end thereof is pivoted on pin 56 spaced above and in substantial transverse alignment with pivot pin 42. Also, the spacing between pivot pins 50, 54 and 52, 56 is substantially equal.

Thus, a review of FIG. 2 indicates that all of the pivot points for the fluid ram as well as for the respective links lie in a single longitudinal vertically extending plane defined longitudinally of the tractor and perpendicular to the transverse axis of the main frame or beam 24 to locate the links 32 and 34 directly above and below the fluid ram 30.

According to a still further aspect of the present invention, the linkage system 18 is specifically designed so as to maintain the ripper shank 22 substantially perpendicular to the ground while the frame 20 is in the ground engaging position while locating the axis of the tooth shank at an acute angle with respect to the ground when the frame is in the transport position. For this purpose, the upper link 34 is slightly greater in length than the lower link 32.

In this manner, the ground engaging position for the frame 20, shown in solid lines in FIG. 1, will dispose the links 32 and 34 substantially parallel to each other since the lower link is slightly shorter than the upper link and the spacing between the respective pivot points 50, 54 and 52, 56 is substantially equal. Therefore, it might be said that the linkage system including column 14 and bracket 26 as well as links 32 and 34 defines a trapezoidal configuration while in the ground engaging position. Of course, retraction of the piston rod 38 within the cylinder 36 will cause the frame 20 to move to the dotted line position shown in FIG. 1 in which position the links form an acute angle with respect to each other to thereby dispose the ripper shank angularly with respect to the ground and the vertical axis defined by the vehicle. This essentially tucks in the lower teeth ends 28 of the shanks 22 to provide a compact structure with the shank teeth being guarded by the major portion of the frame when the entire assembly is in the upper raised or transport position. This of course is extremely desirable for any type of commercial machine.

As can be appreciated from the above description, the particular arrangement of the linkage system and power means between the frame and the tractor of implement provides a compact and efficient manner of mounting the frame for movement relative to the tractor. Furthermore, the operating elements of the fluid ram are at all times protected from vertical forces by rocks or other debris which may be scattered by the teeth engaging substantially fixed obstructions in the ground. Of course, the specific arrangement of the linkage system also provides a compact unit in which the ripper teeth are protected and are disposed forwardly of the main frame of the implement while the implement is in the transport position.

I claim:

1. In combination with a draft vehicle having transversely spaced vertically extending columns at one end thereof, a frame extending transversely of the longitudinal axis of said draft vehicle having at least one ripper tooth attached thereto, linkage means connecting said frame to said columns and power means for raising and lowering said frame on said vehicle, the improvement of said linkage means including a first pair of links each having one end pivotally attached to one of said columns adjacent the lower end thereof and the opposite end pivotally attached to the lower end of said frame, a second pair of links spaced above said first pair of links and respectively pivotally connected to the upper end of one of said columns and the upper end of said frame, with the links connected to each column disposed in a common vertical plane, said power means comprising a pair of fluid rams having relatively axially movable elements, said rams each having a longitudinal axis located in one of said vertical planes and having one of said elements pivotally supported on said frame adjacent its lower end and the other of said elements pivoted on one of said columns adjacent the upper end thereof whereby one link of each pair of said links is disposed directly above and another directly below each of said fluid rams to protect said fluid rams; said first pair of links being shorter than said second pair of links whereby said ripper tooth will be disposed in substantially vertical position relative to a ground surface when said frame is lowered into working position by extension of said fluid rams, and adapted to be swung inwardly towards said vehicle when said frame is raised into transport position by contraction of said fluid rams by means of said shorter links.